United States Patent Office 3,413,123
Patented Nov. 26, 1968

3,413,123
GELATINE COMPOSITIONS CONTAINING ALKYLENE OXIDE HYDROPHOBIC PLASTICIZERS
Fritz Nittel, Cologne-Stammheim, Hans-Georg Kleppe, Opladen, Wolfgang Himmelmann, Cologne-Stammheim, and Hans Ulrich, Leverkusen, Germany, assignors to Agfa-Gevaert Aktiengesellschaft, Leverkusen, Germany, a corporation of Germany
No Drawing. Filed July 14, 1965, Ser. No. 472,047
Claims priority, application Germany, Aug. 20, 1964, A 46,896
16 Claims. (Cl. 96—94)

ABSTRACT OF THE DISCLOSURE

The invention relates to gelatine compositions, in particular photographic silver halide gelatin compositions, containing hydrophobic plasticizers obtained by reaction of 1 mol of a compound containing at least one hydroxyl group with 1 to 10 mols of an alkylene oxide, at least one mol of said alkylene oxide being selected from the group consisting of 3-ethyl-3-hydroxymethyl-trimethylene-oxide and styrene oxide and the remaining mols, if any, being selected from the group consisting of 3-alkoxy propylene oxides-(1,2),3-aroxypropylene oxides-(1,2) and epichlorohydrin. Color couplers may also be present in the silver halide gelatine compositions.

The invention relates to gelatine compositions, in particular photographic gelatine compositions, the mechanical properties of which are improved by incorporation of plasticizers.

Gelatine is the principal binding agent used for the preparation of photographic hydrophilic colloid layers, such as light sensitive silver halide emulsion layers, protective layers, filter layers, intermediate layers, baryta layers, for photographic light-sensitive papers and films. If the gelatine-containing layers are dried to a considerable extent, powerful tensile forces are set up which give rise to deformation. In particular, the hardening which is necessary for to increase the melting point causes the gelatine layers to become brittle and fragile after drying. The flexibility and suppleness are lost and the curling tendency is increased. Due to the poor suppleness of the emulsion layer, the photographic properties are also altered. In the presence of tensile and compressive stresses, sensitization and desensitization effects occur. There have therefore been many attempts to produce plasticizers for gelatine which would improve the desired mechanical and photographic properties of dry gelatine layers. Thus, it has been proposed to use polyhydric alcohols, such as glycerol and glycols, as plasticizers. These compounds are hygroscopic and not genuine plasticizers since they merely control the water balance of gelatine. At humidities of the surrounding atmosphere below 30%, the foils containing such additives are more fragile than those without additive. Instead of hygroscopic glycerol, compounds have been used in which all the OH groups are replaced by —OC₂H₄—OC₂H₄—OC₂H₄—OH radicals. The disadvantage of these compounds lies in the fact that they can easily be washed out. Other suggested compounds, such as triethanolamine, cyclohexyldiethanolamine produce fogging and can also be washed out, other compounds, such as alkyl phenols, decrease the adhesive forces of the layer, or still further compounds, such as the reaction products of ethylene oxide and acid amides produce a marked change in the viscosity of aqueous gelatine solutions.

It has now been found that aqueous gelatine compositions provide layers with excellent mechanical properties, in particular high crease-resistance if there are present in such compositions hydrophobic plasticizers obtained by reaction of 1 mol of a compound containing at least one hydroxyl group with 1 to 20 mols, preferably 1 to 10 mols of an alkylene oxide, at least one mol of said alkylene oxide being selected from the group consisting of 3-ethyl-3-hydroxymethyl-trimethylene oxide and styrene oxide and the remaining mols, if any, being selected from the group consisting of 3-alkoxy propylene oxides-(1,2), 3-aroxypropylene oxides-(1,2), and epichlorohydrin.

Suitable compounds containing at least one hydroxyl group which can be used for the production of the above products are:

Monohydric aliphatic alcohols containing preferably 3 to 18 carbon atoms, such as butanol, 3,5,5-trimethylhexanol, 2,2-dimethyloctanol-(1), stearoyl alcohol, octadecen-(9)-ol-(1); monohydric cycloaliphatic alcohols, such as cyclohexanol; aromatic alcohols such as benzyl alcohol or α-phenylethyl alcohol; monohydric aromatic hydroxy compounds such as phenol, alkylated phenols having 1 to 18 carbon atoms in the alkyl group, such as p-nonyl phenol; polyhydric alcohols in which all hydroxyl groups but one are etherified with monohydric alcohols such as ethylene glycol monobutyl ether, polyethylene glycols having 2 to 10 ethylene oxide units, one hydroxyl group of said polyethylene glycols being etherified with a monohydric saturated aliphatic alcohol having 1 to 18 carbon atoms, e.g. triethylene glycol monoisononyl ether, octaethylene glycol monoisononyl ether; polyhydric alcohols having 2 to 6 hydroxyl groups including polyalkylene oxides having up to 10 alkylene oxide units, especially polyethylene glycols, such as glycol, 2,2-diethylpropane-diol-(1,3), 2,2,4-trimethylpentane-diol-(1,3), 3-methylpentane-diol-(2,4), 3-methylheptane-diol-(1,4), 3-methyl-5-ethyl-heptane-diol-(2,4), octadecane-diol-(2,5), dimethylhexane-diol-(2,5), butane diol, pentane diol, hexane diol, 2-ethylhexane-diol-(1,3), 2,4-dimethyl-2-propylheptane-diol-(1,3), glycerol, trimethylolpropane, hexane-triol-(1,2,6), sorbitol; aliphatic or aromatic mono- or dicarboxylic acids, such as acetic acid, stearic acid, isosebacic acid, lactic acid, abietic acid, terephthalic acid, 4-hydroxy-benzoic acid, furthermore phosphoric acid; the preferred hydroxyl compounds are trihydric alcohols, especially glycerol.

The preferred alkylene oxides (cyclic ethers) for the production of the plasticizers are the 3-ethyl-3-hydroxymethyltrimethylene oxide (hereinafter designated as trimethylene oxide alcohol) and the styrene oxide which may be used individually or in combination with each other. In addition to at least one of the aforementioned alkylene oxides there can be used epichlorohydrin, a 3-alkoxypropylene oxide-(1,2) in which the alkyl group has 1 to 18 carbon atoms, 3-phenoxy-propylene oxide-(1,2), these last mentioned alkylene oxides being usually applied, if at all, in molar amounts not surpassing those of the first mentioned alkylene oxides. Therefore, the plasticizers of the invention comprise structural units of at least one of the following formulae:

I

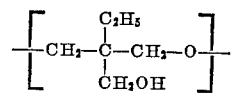

and

II

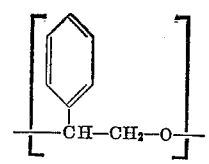

and if desired, structural units of the formulae:

III 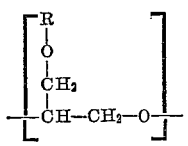

and

IV 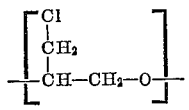

wherein R stands for an alkyl group having up to 18 carbon atoms or for an aryl group, preferably a phenyl group. The plasticizers may be prepared according to methods known as such by reacting the above hydroxylic compounds and alkylene oxides in the recited proportions under conditions under which cleavage of the alkylene oxide ring takes place. As catalyst for such reaction may be used $BF_3$-glacial acetic acid, $SnCl_4$ and other acid catalysts. No catalyst is required for the reaction of the alkylene oxides with phosphoric acid. The general procedure for the preparation of the plasticizers is as follows:

To 1 mol of one of the recited hydroxylic compounds there are added 5 ml. of $BF_3$-glacial acetic acid and the mixture is heated to 60 to 80° C., or, in exceptional cases to 110° C. if the hydroxylic compound is a solid substance and has a melting point above 80° C. and below 110° C. After removal of the heating bath, 1 to 20 mols of the cyclic ether or ethers are added portionwise so that the internal temperature is maintained at 100° C. to 120° C. After complete addition, the mixture is heated for a further hour at 100° C. Highly viscous, colorless to yellow oils are obtained which cannot be distilled. In general, the compounds are colorless so that they can be used directly after neutralization of the catalyst. The substances are purified by dissolving them in alcohol and/or methylene chloride, treating them with fuller's earth or active carbon and removing the solvent by vacuum evaporation.

If the starting compound has a melting point above 110° C. the substance is dissolved or dispersed with a suitable solvent, e.g. in freshly distilled, anhydrous, dioxane diethylene glycol dimethyl ether, toluene or some other suitable solvent and brought to reaction as above. After the reaction is complete the product is clarified with active charcoal or fuller's earth and the solvent removed in vacuo.

The following compounds have proved to be especially suitable:

COMPOUND 1

Reaction product of

| | G. |
|---|---|
| 3,5,5-trimethylhexanol (0.1 mol) | 14.4 |
| Alcohol of trimethylene oxide (0.2 mol) | 23.2 |
| and | |
| Styrene oxide (0.1 mol) | 12 |

COMPOUND 2

Reaction product of

| | G. |
|---|---|
| n-Butanol (0.1 mol) | 7.4 |
| Alcohol of trimethylene oxide (0.2 mol) | 23.2 |
| Styrene oxide (0.2 mol) | 24 |
| Phenoxypropylene oxide (0.1 mol) | 15 |
| and | |
| Epichlorohydrin (0.1 mol) | 9.25 |

COMPOUND 3

Reaction product of

| | G. |
|---|---|
| n-Butanol (0.1 mol) | 7.4 |
| Trimethylene oxide alcohol (0.5 mol) | 58 |
| and | |
| Styrene oxide (0.2 mol) | 24 |

COMPOUND 4

Reaction product of

| | G. |
|---|---|
| Stearyl alcohol (0.1 mol) | 27 |
| Trimethylene oxide alcohol (0.3 mol) | 34.8 |
| Styrene oxide (0.2 mol) | 24 |
| and | |
| Epichlorohydrin (0.1 mol) | 9.25 |

COMPOUND 5

Reaction product of

| | G. |
|---|---|
| α-Phenylethyl alcohol (0.1 mol) | 12.2 |
| Trimethylene oxide alcohol (0.2 mol) | 23.2 |
| and | |
| Styrene oxide (0.1 mol) | 12 |

COMPOUND 6

Reaction product of

| | G. |
|---|---|
| Octadecene-(9)-ol-(1) (0.1 mol) | 26.8 |
| Trimethylene oxide alcohol (0.3 mol) | 34.8 |
| and | |
| Styrene oxide (0.2 mol) | 24 |

COMPOUND 7

Reaction product of

| | G. |
|---|---|
| 2,2-dimethyloctanol-(1) | 15.8 |
| Trimethylene oxide alcohol (0.1 mol) | 11.6 |
| Styrene oxide (0.3 mol) | 36 |
| Phenoxypropylene oxide (0.1 mol) | 15 |
| and | |
| Epichlorohydrin (0.1 mol) | 9.25 |

COMPOUND 8

Reaction product of

| | G. |
|---|---|
| Ethane diol (0.1 mol) | 6.2 |
| Trimethylene oxide alcohol (0.2 mol) | 23.2 |
| Styrene oxide (0.1 mol) | 12 |
| Phenoxypropylene oxide (0.1 mol) | 15 |
| and | |
| Epichlorohydrin (0.1 mol) | 9.25 |

COMPOUND 9

Reaction product of

| | G. |
|---|---|
| 2,2-diethylpropane-(1,3)-diol (0.1 mol) | 13.2 |
| and | |
| Trimethylene oxide alcohol (0.3 mol) | 34.8 |

COMPOUND 10

Reaction product of

| | G. |
|---|---|
| 2,2-diethylpropane-(1,3)-diol (0.1 mol) | 13.2 |
| Trimethylene oxide alcohol (0.3 mol) | 34.8 |
| and | |
| Styrene oxide (0.1 mol) | 12 |

COMPOUND 11

Reaction product of

| | G. |
|---|---|
| 2,2-diethylpropane-(1,3)-diol (0.1 mol) | 13.2 |
| Trimethylene oxide alcohol (0.2 mol) | 23.2 |
| and | |
| Styrene oxide (0.2 mol) | 24 |

COMPOUND 12

Reaction product of

| | G. |
|---|---|
| 2,2-diethylpropane-(1,3)-diol (0.1 mol) | 13.2 |
| Trimethylene oxide alcohol (0.1 mol) | 11.6 |
| and | |
| Styrene oxide (0.3 mol) | 36 |

COMPOUND 13

Reaction product of

| | G. |
|---|---|
| 2,2-diethylpropane-(1,3)-diol (0.1 mol) | 13.2 |
| and | |
| Styrene oxide (0.3 mol) | 36 |

COMPOUND 14

Reaction product of

| | G. |
|---|---|
| 2,2-diethylpropane-(1,3)-diol (0.1 mol) | 13.2 |
| and | |
| Styrene oxide (0.6 mol) | 72 |

COMPOND 15

Reaction product of

| | G. |
|---|---|
| 2,2,4-trimethylpentane-(1,3)-diol (0.1 mol) | 34.4 |
| and | |
| Trimethylene oxide alcohol (0.3 mol) | 34.8 |

COMPOUND 16

Reaction product of

| | G. |
|---|---|
| 3-methylpentane-(2,4)-diol (0.1 mol) | 11.8 |
| Trimethylene oxide alcohol (0.3 mol) | 34.8 |
| and | |
| Styrene oxide (0.1 mol) | 12 |

COMPOND 17

Reaction product of

| | G. |
|---|---|
| 3-methylheptane-(1,4)-diol (0.1 mol) | 14.6 |
| Trimethylene oxide alcohol (0.3 mol) | 34.8 |
| and | |
| Styrene oxide (0.1 mol) | 12 |

COMPOUND 18

Reaction product of

| | G. |
|---|---|
| 3-methyl-5-ethyl-heptane-(2,4)-diol (0.1 mol) | 17.4 |
| Trimethylene oxide alcohol (0.2 mol) | 23.2 |
| Styrene oxide (0.2 mol) | 24 |
| and | |
| Epichlorohydrin (0.1 mol) | 9.25 |

COMPOUND 19

Reaction product of

| | G. |
|---|---|
| Octadecanediol (0.1 mol) | 28.6 |
| Trimethylene oxide alcohol (0.2 mol) | 23.2 |
| and | |
| Styrene oxide (0.3 mol) | 36 |

COMPOUND 20

Reaction product of

| | G. |
|---|---|
| 2,5-dimethyl-hexane-(2,5)-diol (0.1 mol) | 14.6 |
| Trimethylene oxide alcohol (0.3 mol) | 34.8 |
| and | |
| Styrene oxide (0.1 mol) | 12 |

COMPOUND 21

Reaction product of

| | G. |
|---|---|
| Butane-(1,4)-diol (0.1 mol) | 9 |
| Trimethylene oxide alcohol (0.2 mol) | 23.2 |
| and | |
| Styrene oxide (0.2 mol) | 24 |

COMPOUND 22

Reaction product of

| | G. |
|---|---|
| Butane-(1,3)-diol (0.1 mol) | 9 |
| Trimethylene oxide alcohol (0.1 mol) | 11.6 |
| Styrene oxide (0.2 mol) | 24 |
| and | |
| Epichlorohydrin (0.1 mol) | 9.25 |

COMPOUND 23

Reaction product of

| | G. |
|---|---|
| Butane-(1,4)-diol (0.1 mol) | 9 |
| Styrene oxide (0.3 mol) | 36 |
| and | |
| Epichlorohydrin (0.1 mol) | 9.25 |

COMPOUND 24

Reaction product of

| | G. |
|---|---|
| Pentane-(1,5)-diol (0.1 mol) | 10.4 |
| Trimethylene oxide alcohol (0.2 mol) | 23.2 |
| and | |
| Styrene oxide (0.2 mol) | 24 |

COMPOUND 25

Reaction product of

| | G. |
|---|---|
| Hexane-(1,6)-diol (0.1 mol) | 11.8 |
| and | |
| Trimethylene oxide alcohol (0.3 mol) | 34.8 |

COMPOUND 26

Reaction product of

| | G. |
|---|---|
| Texane-(1,6)-diol (0.1 mol) | 11.8 |
| Trimethylene oxide alcohol (0.2 mol) | 23.2 |
| and | |
| Styrene oxide (0.2 mol) | 24 |

COMPOUND 27

Reaction product of

| | G. |
|---|---|
| Hexane-(1,6)-diol (0.1 mol) | 11.8 |
| Trimethylene oxide alcohol (0.3 mol) | 34.8 |
| and | |
| Styrene oxide (0.1 mol) | 12 |

COMPOUND 28

Reaction product of

| | G. |
|---|---|
| Hexane-(1,6)-diol (0.1 mol) | 11.8 |
| Trimethylene oxide alcohol (0.4 mol) | 46.4 |
| and | |
| Styrene oxide (0.5 mol) | 60 |

COMPOUND 29

Reaction product of

| | G. |
|---|---|
| Hexane-(1,6)-diol (0.1 mol) | 11.8 |
| Trimethylene oxide alcohol (0.3 mol) | 34.8 |
| Styrene oxide (0.3 mol) | 36 |
| Phenoxypropylene oxide (0.1 mol) | 15 |
| and | |
| Epichlorohydrin (0.1 mol) | 9.25 |

COMPOUND 30

Reaction product of

| | G. |
|---|---|
| 2-ethyl-hexane-(1,3)-diol (0.1 mol) | 14.6 |
| Trimethylene oxide alcohol (0.2 mol) | 23.2 |
| and | |
| Styrene oxide (0.2 mol) | 24 |

COMPOUND 31

Reaction product of

| | G. |
|---|---|
| 2,4-dimethyl-2-propyl-heptane-(1,3)-diol (0.1 mol) | 18.2 |
| Trimethylene oxide alcohol (0.3 mol) | 34.8 |
| and | |
| Styrene oxide (0.2 mol) | 24 |

COMPOUND 32

Reaction product of

| | G. |
|---|---|
| 3-methyl-5-ethyl-nonane-(2,4)-diol (0.1 mol) | 18.2 |
| Trimethylene oxide alcohol (0.3 mol) | 34.8 |
| and | |
| Styrene oxide (0.2 mol) | 24 |

COMPOUND 33

Reaction product of

| | G. |
|---|---|
| Glycerol (freshly distilled) (0.1 mol) | 9.2 |
| and | |
| Trimethylene oxide alcohol (0.3 mol) | 34.8 |

COMPOUND 34

Reaction product of

| | G. |
|---|---|
| Glycerol (freshly distilled) (0.1 mol) | 9.2 |
| Trimethylene oxide alcohol (0.2 mol) | 23.2 |
| and | |
| Styrene oxide (0.2 mol) | 24 |

COMPOUND 35

Reaction product of

| | G. |
|---|---|
| Glycerol (freshly distilled) (0.1 mol) | 9.2 |
| Trimethylene oxide alcohol (0.2 mol) | 23.2 |
| Styrene oxide (0.1 mol) | 12 |
| and | |
| Phenoxypropylene oxide (0.1 mol) | 15 |

COMPOUND 36

Reaction product of

| | G. |
|---|---|
| Hexane-(1,2,6)-triol (fresh distilled) (0.1 mol) | 13.4 |
| and | |
| Trimethylene oxide alcohol (0.3 mol) | 34.8 |

COMPOUND 37

Reaction product of

| | G. |
|---|---|
| Hexane-(1,2,6)-triol (fresh distilled) (0.1 mol) | 13.4 |
| Trimethylene oxide alcohol (0.3 mol) | 34.8 |
| and | |
| Styrene oxide (0.2 mol) | 24 |

COMPOUND 38

Reaction product of

| | G. |
|---|---|
| d-Sorbitol (0.1 mol) | 18.2 |
| Trimethylene oxide alcohol (0.3 mol) | 34.8 |
| and | |
| Styrene oxide (0.3 mol) | 36 |

COMPOUND 39

Reaction product of

| | G. |
|---|---|
| d-Sorbitol (0.1 mol) | 18.2 |
| Trimethylene oxide alcohol (0.4 mol) | 46.4 |
| and | |
| Styrene oxide (0.4 mol) | 48 |

COMPOUND 40

Reaction product of

| | G. |
|---|---|
| d-Sorbitol (0.1 mol) | 18.2 |
| Trimethylene oxide alcohol (0.2 mol) | 23.2 |
| Styrene oxide (0.2 mol) | 24 |
| Phenoxypropylene oxide (0.2 mol) | 30 |
| and | |
| Epichlorohydrin (0.2 mol) | 18.5 |

COMPOUND 41

Reaction product of

| | G. |
|---|---|
| Glacial acetic acid (0.1 mol) | 6 |
| and | |
| Trimethylene oxide alcohol (0.1 mol) | 11.6 |

COMPOUND 42

Reaction product of

| | G. |
|---|---|
| Glacial acetic acid (0.1 mol) | 6 |
| Trimethylene oxide alcohol (0.3 mol) | 34.8 |
| and | |
| Styrene oxide (0.2 mol) | 24 |

COMPOUND 43

Reaction product of

| | G. |
|---|---|
| Stearic acid (0.1 mol) | 28.4 |
| Trimethylene oxide alcohol (0.2 mol) | 23.2 |
| and | |
| Styrene oxide (0.3 mol) | 36 |

COMPOUND 44

Reaction product of

| | G. |
|---|---|
| Isosebacic acid (0.1 mol) | 20.2 |
| and | |
| Trimethylene oxide alcohol (0.2 mol) | 23.2 |

COMPOUND 45

Reaction product of

| | G. |
|---|---|
| Isosebacic acid (0.1 mol) | 20.2 |
| Trimethylene oxide alcohol (0.4 mol) | 46.4 |
| and | |
| Styrene oxide (0.3 mol) | 36 |

COMPOUND 46

Reaction product of

| | G. |
|---|---|
| Lactic acid (0.1 mol) | 9 |
| and | |
| Trimethylene oxide alcohol (0.1 mol) | 11.6 |

COMPOUND 47

Reaction product of

| | G. |
|---|---|
| Lactic acid (0.1 mol) | 9 |
| Trimethylene oxide alcohol (0.3 mol) | 34.8 |
| and | |
| Styrene oxide (0.1 mol) | 12 |

COMPOUND 48

Reaction product of

| | G. |
|---|---|
| Cyclohexanol (0.1 mol) | 10 |
| Trimethylene oxide alcohol (0.2 mol) | 23.2 |
| and | |
| Styrene oxide (0.1 mol) | 12 |

COMPOUND 49

Reaction product of

| | G. |
|---|---|
| Decalol (0.1 mol) | 15.4 |
| Trimethylene oxide alcohol (0.3 mol) | 34.8 |
| and | |
| Styrene oxide (0.3 mol) | 36 |

COMPOUND 50

Reaction product of

| | G. |
|---|---|
| Abietic acid (0.1 mol) | 30.2 |
| Trimethylene oxide alcohol (0.2 mol) | 23.2 |
| and | |
| Styrene oxide (0.3 mol) | 36 |

COMPOUND 51

Reaction product of

| | G. |
|---|---|
| Abietic acid (0.1 mol) | 30.2 |
| Trimethylene oxide alcohol (0.4 mol) | 46.4 |
| and | |
| Styrene oxide (0.3 mol) | 36 |

COMPOUND 52

Reaction product of

| | G. |
|---|---|
| Isododecyl phenol (0.1 mol) | 26.2 |
| Trimethylene oxide alcohol (0.2 mol) | 23.2 |
| and | |
| Styrene oxide (0.2 mol) | 24 |

COMPOUND 53

Reaction product of

| | G. |
|---|---|
| 4-hydroxybenzoic acid (0.1 mol) | 13.8 |
| Trimethylene oxide alcohol (0.2 mol) | 23.2 |
| and | |
| Styrene oxide (0.3 mol) | 36 |

COMPOUND 54

Reaction product of

| | G. |
|---|---|
| Terephthalic acid (0.1 mol) | 16.6 |
| Trimethylene oxide alcohol (0.3 mol) | 34.8 |
| and | |
| Styrene oxide (0.4 mol) | 48 |

COMPOUND 55

Reaction product of

| | G. |
|---|---|
| Ortho-phosphoric acid (0.1 mol) | 9.8 |
| and | |
| Trimethylene oxide alcohol (0.4 mol) | 46.4 |

COMPOUND 56

Reaction product of

| | G. |
|---|---|
| Ortho-phosphoric acid (0.1 mol) | 9.8 |
| Trimethylene oxide alcohol (0.3 mol) | 34.8 |
| and | |
| Styrene oxide (0.3 mol) | 36 |

COMPOUND 57

Reaction product of

| | G. |
|---|---|
| n-Butanol, (0.1 mol) | 7.4 |
| Trimethylene oxide alcohol (0.1 mol) | 11.6 |
| Styrene oxide (0.2 mol) | 24 |
| and | |
| Isononyl hydroxypropylene oxide (0.1 mol) | 20 |

COMPOUND 58

Reaction product of

| | G. |
|---|---|
| n-Butanol (0.1 mol) | 7.4 |
| Styrene oxide (0.3 mol) | 36 |
| and | |
| Isononyl hydroxypropylene oxide (0.15 mol) | 30 |

COMPOUND 59

Reaction product of

| | G. |
|---|---|
| n-Butanol (0.1 mol) | 7.4 |
| Trimethylene oxide alcohol (0.6 mol) | 69.6 |
| and | |
| Styrene oxide (0.6 mol) | 72 |

COMPOUND 60

Reaction product of

| | G. |
|---|---|
| Glycerol (0.1 mol) | 9.2 |
| Trimethylene oxide alcohol (0.1 mol) | 11.6 |
| and | |
| Styrene oxide (0.2 mol) | 24 |

COMPOUND 61

Reaction product of

| | G. |
|---|---|
| Glycerol (0.1 mol) | 9.2 |
| Trimethylene oxide alcohol (0.1 mol) | 11.6 |
| and | |
| Styrene oxide (0.3 mol) | 36 |

COMPOUND 62

Reaction product of

| | G. |
|---|---|
| Glycerol (0.1 mol) | 9.2 |
| Trimethylene oxide alcohol (0.1 mol) | 11.6 |
| and | |
| Styrene oxide (0.4 mol) | 48 |

COMPOUND 63

Reaction product of

| | G. |
|---|---|
| Glycerol (0.1 mol) | 9.2 |
| Trimethylene oxide alcohol (0.1 mol) | 11.6 |
| and | |
| Styrene oxide (0.8 mol) | 96 |

COMPOUND 64

Reaction product of

| | G. |
|---|---|
| Hexanetriol-(1,2,6) (0.1 mol) | 13.4 |
| Trimethylene oxide alcohol (0.1 mol) | 11.6 |
| and | |
| Styrene oxide (0.2 mol) | 24 |

COMPOUND 65

Reaction product of

| | G. |
|---|---|
| Hexanetriol-(1,2,6) (0.1 mol) | 13.4 |
| Trimethylene oxide alcohol (0.1 mol) | 11.6 |
| and | |
| Styrene oxide (0.3 mol) | 36 |

COMPOUND 66

Reaction product of

| | G. |
|---|---|
| Hexanetriol-(1,2,6) (0.1 mol) | 13.4 |
| Trimethylene oxide alcohol (0.1 mol) | 11.6 |
| and | |
| Styrene oxide (0.4 mol) | 48 |

COMPOUND 67

Reaction product of

| | G. |
|---|---|
| Hexanetriol-(1,2,6) (0.1 mol) | 13.4 |
| Trimethylene oxide alcohol (0.1 mol) | 11.6 |
| and | |
| Styrene oxide (0.8 mol) | 96 |

COMPOUND 68

Reaction product of

| | G. |
|---|---|
| Diethylene glycol (0.1 mol) | 10.4 |
| Trimethylene oxide alcohol (0.1 mol) | 11.6 |
| and | |
| Styrene oxide (0.2 mol) | 24 |

COMPOUND 69

Reaction product of

| | G. |
|---|---|
| Diethylene glycol (0.1 mol) | 10.4 |
| Trimethylene oxide alcohol (0.1 mol) | 11.6 |
| and | |
| Styrene oxide (0.4 mol) | 48 |

COMPOUND 70

Reaction product of

| | G. |
|---|---|
| Diethylene glycol (0.1 mol) | 10.4 |
| Trimethylene oxide alcohol (0.1 mol) | 11.6 |
| and | |
| Styrene oxide (0.8 mol) | 96 |

COMPOUND 71

Reaction product of

| | G. |
|---|---|
| Triethylene glycol (0.1 mol) | 14.8 |
| Trimethylene oxide alcohol (0.1 mol) | 11.6 |
| and | |
| Styrene oxide (0.2 mol) | 24 |

COMPOUND 72

Reaction product of

| | G. |
|---|---|
| Triethylene glycol (0.1 mol) | 14.8 |
| Trimethylene oxide alcohol (0.1 mol) | 11.6 |
| and | |
| Styrene oxide (0.4 mol) | 48 |

COMPOUND 73

Reaction product of

| | G. |
|---|---|
| Triethylene glycol (0.1 mol) | 14.8 |
| Trimethylene oxide alcohol (0.1 mol) | 11.6 |
| and | |
| Styrene oxide (0.8 mol) | 96 |

COMPOUND 74

Reaction product of

| | G. |
|---|---|
| Octaethylene glycol (0.1 mol) | 36.8 |
| Trimethylene oxide alcohol (0.1 mol) | 11.6 |
| and | |
| Styrene oxide (0.2 mol) | 24 |

COMPOUND 75

Reaction product of

| | G. |
|---|---|
| Octaethylene glycol (0.1 mol) | 36.8 |
| Trimethylene oxide alcohol (0.1 mol) | 11.6 |
| and | |
| Styrene oxide (0.4 mol) | 48 |

COMPOUND 76

Reaction product of

| | G. |
|---|---|
| Octaethylene glycol (0.1 mol) | 36.8 |
| Trimethylene oxide alcohol (0.1 mol) | 11.6 |
| and | |
| Styrene oxide (0.8 mol) | 96 |

COMPOUND 77

Reaction product of

| | G. |
|---|---|
| Triethylene glycol monoisononylether (0.1 mol) | 27.6 |
| Trimethylene oxide alcohol (0.1 mol) | 11.6 |
| and | |
| Styrene oxide (0.2 mol) | 24 |

COMPOUND 78

Reaction product of

| | G. |
|---|---|
| Triethylene glycol monoisononylether (0.1 mol) | 27.6 |
| Trimethylene oxide alcohol (0.1 mol) | 11.6 |
| and | |
| Styrene oxide (0.4 mol) | 48 |

COMPOUND 79

Reaction product of

| | G. |
|---|---|
| Triethylene glycol monoisononylether (0.1 mol) | 27.6 |
| Trimethylene oxide alcohol (0.1 mol) | 11.6 |
| and | |
| Styrene oxide (0.8 mol) | 96 |

COMPOUND 80

Reaction product of

| | G. |
|---|---|
| Octaethylene glycol monoisononylether (0.1 mol) | 49.6 |
| Trimethylene oxide alcohol (0.1 mol) | 11.6 |
| and | |
| Styrene oxide (0.2 mol) | 24 |

COMPOUND 81

Reaction product of

| | G. |
|---|---|
| Octaethylene glycol monoisononylether (0.1 mol) | 49.6 |
| Trimethylene oxide alcohol (0.1 mol) | 11.6 |
| and | |
| Styrene oxide (0.4 mol) | 48 |

COMPOUND 82

Reaction product of

| | G. |
|---|---|
| Octaethylene glycol monoisononylether (0.1 mol) | 49.6 |
| Trimethylene oxide alcohol (0.1 mol) | 11.6 |
| and | |
| Styrene oxide (0.8) | 96 |

The plasticizers of the present invention are found to improve gelatine when incorporated therein in the proportion of 5 to 50%, preferably 15 to 40%, based on the weight of the gelatine. They are hydrophobic, highly viscous to semi-solid substances which are readily soluble in organic solvents and can easily be emulsified in gelatine coating compositions, such as aqueous gelatine solutions or silver halide-gelatine photographic emulsions. The plasticizers may be used in silver halide emulsions intended for black-and-white or for colorphotography, for example, emulsions containing color couplers for color forming development, such as naphthols, pyrazolones or open-chain ketomethylene compounds. If these plasticizers are emulsified together with well crystallizing substances, e.g. color couplers, U.V. absorbents in gelatine, then they prevent crystallization of these substances. The aforementioned compositions may be coated out onto a photographic film base, onto a photographic paper or onto other photographic layers to form a photographic product. Due to their hydrophobic properties the plasticizers of the present invention are not washed out during the processing of the resulting photographic layers. They increase the flexibility of the photographic layers considerably and prevent the layers from becoming fragile at low humidity.

Example

To separate parts of a mixture of 1 liter of a photographic emulsion which contains

|  | G. |
|---|---|
| Silver halide | 35 |
| and |  |
| Gelatine | 80 | there are added, based on the quantity of gelatine, 30% of the compounds 9, 10, 13, 15, 25, 27, 46 with vigorous stirring. The compounds are dissolved in $$CH_2Cl_2/C_2H_5OH$$

If desired, the compounds may be emulsified in a separate aqueous gelatine solution in the ratio 1:1 and to the silver halide emulsion there may be added a quantity of emulsified plasticizer such that the concentration in plasticizer is 30%, based on the quantity of gelatine. 20 g. of 1-hydroxy-4-sulfo-2-naphthoic acid heptadecylamide is then added as color coupler. The mixtures are poured onto a photographic cellulose triacetate film base and the resulting coatings are dried at room temperature. The thickness of the layers is 18μ. Test strips 1.5 cm. in width and 30 cm. in length are cut from the lengths of film. These strips are processed according to the prescription given in Fiat Final Report 943, page 83 for the processing of negative color cine films. They are then conditioned for 48 hours at 30% relative humidity or 50% relative humidity at 22° C. The fragility of the film strips is determined by a test method which is described below. The test is also carried out under the atmospheric conditions indicated.

The film strips are pulled with their active side outwards over two deflecting rollers mounted in ball bearings (roller diameter 5 mm.) which bend the film twice at right angles at a distance apart of 1.5 cm. The film is stretched by a weight of 1 kg. and periodically pulled over the two deflecting rollers by an eccentric arrangement. At each stroke, the film is subjected to a severe mechanical stress and after a certain number of strokes it tears. The number of strokes is automatically determined and gives a measure of the mechanical quality of the film; the higher the value attained the better is the mechanical quality of the film. The values indicated are average values obtained by four measurements. The measurement was broken off when a value of 1500 was reached. Only films of excellent quality show this value. In addition, the fragility of the support interferes too much in the measurement at values above 1500. Result:

| Additive | 30% relative humidity | 50% relative humidity |
|---|---|---|
| Control | 60 | 100 |
| 30% compound 25 | 1,370 | >1,500 |
| 30% compound 27 | 1,210 | >1,500 |
| 30% compound 9 | 1,330 | >1,500 |
| 30% compound 10 | 1,380 | >1,500 |
| 30% compound 13 | 960 | 1,200 |
| 30% compound 15 | 900 | 910 |
| 30% compound 46 | 300 | 800 |

The values show that the compounds according to the invention greatly reduce the fragility even at 30% relative humidity.

Further suitable plasticizers according to the invention are reaction products of 1 mol of glycerol with 3 to 10 mols of styrene oxide, or of 1 mol of trimethylolpropane with 3 mols of styrene oxide, or of 1 mol of pentaerythritol with 4 to 10 mols of styrene oxide.

What we claim is:

1. A gelatine composition comprising 5 to 50%, based on the weight of the gelatine, of a hydrophobic reaction product of (a) 1 mol of a compound containing a hydroxy group capable of reacting with an alkylene oxide and (b) 1 to 20 mols of alkylene oxides selected from the group consisting of 3-ethyl-3-hydroxymethyltrimethylene oxide, styrene oxide, 3-alkoxypropylene oxides-(1,2), 3-aroxypropylene oxides-(1,2) and epichlorohydrin, at least 1 mol of said alkylene oxides being selected from the group consisting of 3-ethyl-3-hydroxymethyl-trimethylene oxide and styrene oxide.

2. Gelatine composition according to claim 1, wherein said compound containing a hydroxy group is selected from the group consisting of monohydric alcohols, polyhydric alcohols containing up to 6 hydroxy groups, phenols, monocarboxylic acids, dicarboxylic acids and phosphoric acid.

3. Gelatine composition according to claim 1, wherein said hydrophobic reaction product is obtained by reacting 1 mol of a polyhydric alcohol having up to 6 hydroxy groups with 1 to 10 mols of at least one alkylene oxide, selected from the group consisting of 3-ethyl-3-hydroxymethyl-trimethylene oxide and styrene oxide.

4. Gelatine composition according to claim 3, wherein said polyhydric alcohol is glycerol.

5. A composition of matter according to claim 1, wherein said gelatine composition is a gelatine-silver halide photographic emulsion.

6. A composition of matter according to claim 5, wherein said gelatine-silver halide photographic emulsion contains in addition to said hydrophobic reaction product a color coupler for the color forming development.

7. A composition of matter according to claim 2, wherein said gelatine composition is a gelatine-silver halide photographic emulsion.

8. A composition of matter according to claim 7, wherein said gelatine-silver halide photographic emulsion contains in addition to said hydrophobic reaction product a color coupler for the color forming development.

9. A composition of matter according to claim 3, wherein said gelatine composition is a gelatine-silver halide photographic emulsion.

10. A composition of matter according to claim 9, wherein said gelatine-silver halide photographic emulsion contains in addition to said hydrophobic reaction product a color coupler for the color forming development.

11. A composition of matter according to claim 4, wherein said gelatine composition is a gelatine-silver halide photographic emulsion.

12. A composition of matter according to claim 11, wherein said gelatine-silver halide photographic emulsion contains in addition to said hydrophobic reaction product a color coupler for the color forming development.

13. A gelatine composition containing a plasticizing amount of a hydrophobic plasticizer obtained by reacting
    (a) one mole of a compound containing at least one hydroxyl group with
    (b) one to twenty mols of an alkylene oxide, at least one mole of said alkylene oxide being selected from the group consisting of 3-ethyl-3-hydroxymethyl-trimethylene oxide, styrene oxide and mixtures thereof, the remaining moles being selected from the group consisting of 3-alkoxy propylene oxide-(1,2) having up to 18 carbon atoms in the alkoxy group, 3-phenoxypropylene oxide-(1,2), epichlorohydrin and mixtures thereof.

14. The gelatine composition according to claim 13 wherein the gelatine composition is a photographic gelatine composition.

15. The gelatine composition according to claim 13 wherein the alkylene oxide consists of a member selected from the group consisting of 3-ethyl-3-hydroxymethyltrimethylene oxide, styrene oxide and mixtures thereof.

16. The gelatine composition according to claim 13 wherein the compound containing at least one hydroxyl group is selected from the group consisting of monohydric aliphatic alcohols having from 3 to 18 carbon atoms, monohydric cycloaliphatic alcohols, benzyl alcohol, α-phenylethyl alcohol, phenol, alkylated phenol having up to 18 carbon atoms in the alkyl group, polyhydric alcohols having all but one hydroxyl group etherified with a monohydric alcohol, polyhydric alcohols having 2 to 6 hydroxy groups, aliphatic carboxylic acid, aromatic carboxylic acid and phosphoric acid.

References Cited

UNITED STATES PATENTS

| 2,641,614 | 6/1953 | Britton et al. |
| 2,677,700 | 5/1954 | Jackson et al. |
| 2,888,489 | 5/1959 | Horsley et al. |

FOREIGN PATENTS 804,283   11/1958   Great Britain.

J. TRAVIS BROWN, *Primary Examiner*.